United States Patent [19]

Baba

[11] Patent Number: 4,773,862

[45] Date of Patent: Sep. 27, 1988

[54] METHOD FOR MAPPING A JOINT VENTURE AND MAPS PRODUCED THEREBY

[75] Inventor: Marietta L. Baba, Detroit, Mich.

[73] Assignee: Board of Governors of Wayne State University, Detroit, Mich.

[21] Appl. No.: 84,319

[22] Filed: Aug. 10, 1987

[51] Int. Cl.⁴ .............................................. G09B 19/00
[52] U.S. Cl. .................................... 434/154; 434/109
[58] Field of Search ............... 434/154, 107, 108, 109; 283/115, 116, 48 R

[56] References Cited

U.S. PATENT DOCUMENTS

| | | | |
|---|---|---|---|
| 3,290,797 | 12/1966 | Opel | 434/108 |
| 3,500,557 | 3/1970 | White | 434/108 |
| 3,564,731 | 2/1971 | Weller | 434/108 |
| 3,596,388 | 8/1971 | Shorten | 434/109 |
| 4,019,027 | 4/1977 | Kelly | 434/108 |
| 4,464,122 | 8/1984 | Fuller et al. | 283/115 |
| 4,483,680 | 11/1984 | Daly | 283/115 |
| 4,639,226 | 1/1987 | Rahn et al. | 283/115 |

Primary Examiner—James C. Yeung
Attorney, Agent, or Firm—Ian C. McLeod

[57] ABSTRACT

A method and map (10) for charting historical events by ventures A and B in a joint venture is described. The method and map enable a visual understanding of the operation of joint venture in the past and possibly more effective development of the joint venture in the future.

10 Claims, 3 Drawing Sheets

FIG.1

METHOD FOR MAPPING A JOINT VENTURE AND MAPS PRODUCED THEREBY

BACKGROUND OF THE INVENTION

(1) Summary of the Invention

The present invention relates to a method to reliably reconstruct linear time sequences of critical historical events from perspectives of two or more parties. Specifically, the method permits mapping of events pertaining to formation of a joint venture from the perspectives of partners A and B. In particular, the present invention relates to a map which enables the joint venturers to pinpoint communication failures during the process of joint venture formation, and to more effectively conduct and/or assess the performance of the joint venture.

(2) Prior Art

One significant phenomenon reported recently in the organizational science literature is the increasing frequency of organizational partnerships or joint ventures (JVs). Joint ventures permit two or more autonomous organizational entities to pool their strengths in order to accomplish a goal that neither would have been able to achieve alone. The most salient characteristics of the joint venture (or partnership), and those which distinguish it from other forms of interorganizational relations, are: 1. the primacy of goal-oriented resource pooling as a raison d'etre; and 2. continuing management oversight from two or more autonomous organizational parents. Joint ventures not only perform all the major functions of interorganizational linkages generally (i.e. resource exchange and management of turbulence), but also are intended to bring an added degree of stability, long-term commitment and economies of scale to the relationship. Organizational joint ventures may occur in the public sector (e.g. linkages between health and welfare organizations), the private sector (e.g. international joint business ventures), or may cross sectors by joining public and private organizations (e.g. relationships between universities and industry). In addition, joint ventures may be used to join organizations that are based in one nation (i.e. domestic joint ventures, or JVs), or those that are based in two or more different nations (i.e. international joint ventures, or IJVs.)

While the number of joint ventures is increasing, their long-term effectiveness is constrained by the fact that JV's suffer from a relatively high degree of instability and are subject to frequent dissolution; in two major studies of private sector JVs, one-quarter of the JV's failed to survive the study period. Unfortunately, the reasons why IJVs fail are not clear. Several competing hypotheses have been advanced to explain joint venture instability, with one of the most logical being the explanation that discordance in structural factors related to organizational, product or industry characteristics of the two corporate partners are primary causes for friction and disruption. More recently, scholarly efforts have focused on the dynamic or process-related aspects of joint venture instability, including discordant parental objectives in IJV formation, or changes in parental objectives over time.

Among this latter group of explanations, one sub-hypothesis holds that the partners' objectives diverge over time, making the JV more and more difficult to manage and less successful (or productive) from the standpoint of one or both partners. Another related sub-hypothesis holds that the partners never really understood one another's interests and objectives in the first place (partly as the result of cross-cultural miscummunication). According to this sub-hypothesis, the partners gradually come to understand one another's true intentions over time, and they gradually realize that the venture cannot satisfy the requirements of both parties. Alternately, they realize that earlier misunderstandings have created serious management problems which reduce the venture's performance. In many of these cases, the partners resolve their difficulties through dissolution of the venture or through sellout to one party. While this group of hypotheses is interesting and attractive to many researchers, the hypotheses have been difficult to test with traditional research techniques that dominate the social sciences (i.e. structured interviewing, usually directed to one partner only, with results analyzed and displayed in a generally qualitative (i.e. textual format.)

In order to test these hypotheses it is necessary to use methods that: (a) accurately portray differences in both partners' perceptions of the JV experience; (b) have a high degree of cross-cultural or cross-organizational validity (i.e. are not biased through preconceptions imposed by the culture or organization of one partner); and (c) also are reliable (i.e. yield the same results for different researchers).

The method of the present invention was developed as a research tool to provide a valid and reliable window on cross-cultural or cross-organizational understanding and communication during the planning and early operating stages of a JV. The method produces two different chronologies of critical events leading up to and deriving from the formation of the JV—one from the perspective of each partner. The objective is to see the past with as little distortion as possible through the eyes of two different parties and to compare these historical perspectives in an effort to identify points of breakdown in cross-cultural communication and understanding. The theoretical foundations of the method rest in cognitive psychology and anthropology (specifically ethnoscience). Theoretically speaking, the method is *not* designed to produce an "objective" reconstruction of the past, but to produce two valid "subjective" accounts that can be compared for diagnostic purposes.

The method yields data that permits clear identification of differences in the partners' interpretations of the past, e.g. what happened, what was important and why, what was forgotten or ignored, how and why events were linked. The method can determine whether and where significant communication breakdowns occurred, and how these breakdowns may have led to emergent issues and problems in the JV. Such information, especially when linked to a body of cross-cultural knowledge that allow generalization and prediction from specific cases, is very useful to managers in diagnosing JV problems, and in planning future JV's.

OBJECTS

It is therefore an object of the present invention to provide a method for mapping historical events in a joint venture so that differences in perception can be understood and possibly be resolved. Further the present invention relates to a historical method for mapping a joint venture which allows joint venturers A and B to more effectively understand differences in the operation of the joint venture due to cultural differences (including differences in national and organizational culture). Further it is an object of the present invention to provide a method of using a map which is simple to construct and replicable. These and other objects will become increasingly apparent by reference to the following description and the drawings.

IN THE DRAWINGS

FIG. 1 is a front view of a preferred map of the present invention.

Figure 2:
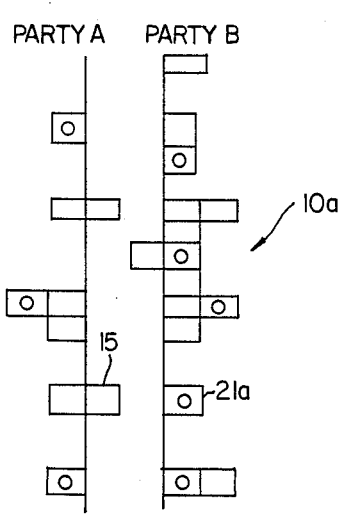
Figure 3:
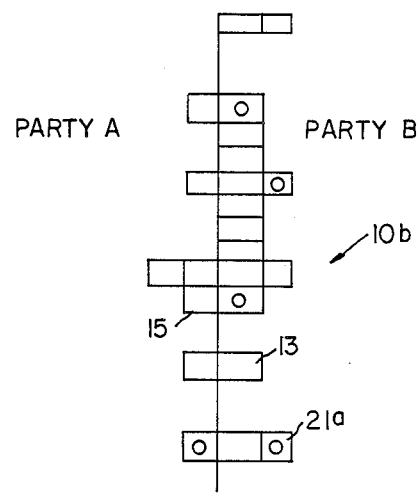
Figure 4:
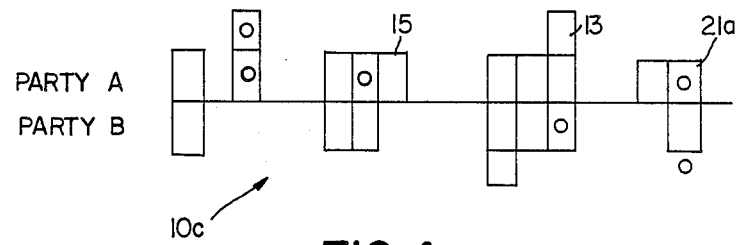

FIGS. 2, 3, and 4 are front views showing alternate forms of the maps 10a, 10b and 10c.

GENERAL DESCRIPTION

The present invention relates to a method for mapping organizational events from an individual perspective of two different venturers A and B which comprises: separately gathering event data by an initial interview from each of the venturer A and B on a chronological basis, wherein the event data separately includes the content and dates of meetings, documents, decisions and environmental shifts and documentation by each venturer A and B for the event data; separately re-interviewing each venturer A and B to gather unevent data not seen as significant in the initial interview and the documentation by each venturer A and B for the unevent data; mapping the event and unevent data chronologically on a map which comprises chronological segments by days, months or years across a sheet of paper with the days, months or years separated along the chronological segments; first segments for mapping the event data in the first segments in parallel spaced relationship to the chronological segments and second segments in parallel spaced relationship to the first segments for venturer A for mapping the unevent data in the second segments; third segments for venturer B for mapping the event data in the third segments in parallel spaced relationship to the chronological segment and below the first and second segments for venturer A and fourth segments in parallel spaced relationship to the third segments of venturer B for mapping the unevent data in the fourth segments with an indication of the documentation fo venturers A and B for each of the events and unevent data; and analyzing the data on the map to determine where there were differences in the event data and unevent data.

Further the present invention relates to a chronological map for organizational events from an individual perspective of two different venturers A and B which comprises: chronological segments by days, months or years across a sheet of paper with the days, months or years separated along the chronological line; first segments along the chronological segments and a second segments in parallel spaced relationship to the first segments for venturer A; third segments for venturer B in parallel spaced relationship to the chronological segments and below the first and second segments for venturer A and fourth segments in parallel spaced relationship to the third segments of venturer B; and events plotted on the chronological map by the method which comprises separately gathering event data by an initial interview from each of the venturers A and B on a chronological basis, wherein the event data separately includes the content and dates of meetings, documents, decisions and environmental shifts as the event data and documentation by each venturer A and B for the event data; separately re-interviewing each venturer A and B to gather unevent data not seen as significant in the initial interview and the documentation by each of the venturers A and B for the unevent data; mapping for venturer A the event data in the first segments and the unevent data in the second segments and mapping for venturer B the event data in the third segments and the unevent data in the fourth segments with an indication of the documentation for venturer A in the first and second segments and for venturer B in the third and fourth segments.

The following discussion relates to international joint ventures (IJVs); however, they can apply also to domestic joint ventures. The problems are less aggravated in the latter case.

A historical reconstruction of the IJV is a needed first step in studying culture-based differences in IJV development over time. This method consists of a parallel oral history approach supplemented with archival documentation from the two partner companies and the IJV itself. Employees of the two parental organizations are asked to provide a verbal account of the history of the joint venture, the development of their organization's relationship with the IJV partner, and the evolution of the IJV to the present day. These verbal accounts, representing the informants' perceptions and understandings of key events in the process of the IJV formation, supplemented with both internal and external written documentation (including memos, letters, minutes from meetings, and media reports), provide insight into the cognitive constructs that frame the IJV experience generally. This data is referred to as "event data".

The data can be stratified by job classification and tenure with the firm at the time of the IJV formation. Two open-ended interviews of approximately one hour in length are conducted with each informant. The first interview is conducted with all informants participating in the study before any second interviews are undertaken. The time between the two sets of interviews allow the researchers to derive a more objective overview from the written source, thus framing their second set of interview questions. These parallel oral histories employ questions designed to eliminate cultural bias; that is, the questions can be prepared by a bilingual/bicultural team that attempts to neutralize the effects of underlying cultural values.

During the first interview, informants are asked to recount the history of their parent firm, how contact was initiated with their firm's partner, and the story of how the IJV was started. The purpose of these three principal questions is to elicit both a time line of what the informants identify as significant events in the IJV process and their views of the "origin myth" of the IJV. It is recognized that the elicitation of these data is subject to limitations such as the informants' experience with or participation in the IJV process, and memory problems associating with recounting the chronology and identifying elements of the origin myth. These shortcomings notwithstanding, oral histories provide a uniquely inductive view of the insiders' experience of the IJV process, a view which should be relevant to the success or failure of the IJV.

The second hour of interviewing furnishes the opportunity to obtain more indepth data, referred to as "unevent data", on both the development of the IJV and the effect of the IJV formation on the careers of the individual employees. The second interview also provides a means to check the accuracy of the event time line. In order to generate discussion and to check for accuracy, the informants are shown a graphic depiction of his/her account of the IJV formation; the researchers will have prepared this time line in advance, based on the previous interview with that individual. The individual elaborates on the significant events in the chronology and is hopefully able to either identify or speculate on: (1) possible options that the IJV faced at certain points in time, (2) the reasoning behind the selection of certain options over others, and (3) causal or other types of linkages among events.

Once the data collection stage is completed, the chronologies of the employees are analyzed in relation to one another as well as the time line of events developed by the researchers from all of the aggregated interview event and unevent data and archival documentation. Analysis of the reported chronologies and their meaning enable the isolation of socio-cultural differences among the two partner firms and the IJV. The potential areas of difference include: (1) fundamental assumptions about IJV's (what is the cultural meaning of an IJV, why does one enter an IJV, what should an IJV become, what problems does one anticipate); (2) perceptions regarding the relative significance of various events and turning points (what were the crucial events from the standpoint of each partner); and (3) perceptions regarding appropriate courses of action or alternative choices facing management at key points in time (what appropriate courses of action were open to each partner and the IJV). Similarities among the cognitive maps also are of interest and may reflect points of shared cultural or organizational ideology or effective intercultural communication processes. Furthermore, information derived from a comparison of cognitive chronologies is useful in developing more quantitatively-oriented research strategies in the future, linking structure and process variables with performance outcomes.

PROCEDURES FOR MAP PRODUCTION

1. A group of informants from each partner organization who were involved in the JV is selected. These individuals represent different organizational levels.

2. One long, non-directive interview is conducted with each informant, asking them to "tell a story of key events in the history of the JV." The story is interrupted only to make sure we understood what was said. We work with bilingual/bicultural researchers to ensure that our interviewing style is correct for the culture we are interested in. We also use bilingual interviews so that stories can be told in the native language.

3. After the first interview, a dateline is developed listing and describing events in the study, and the date lines checked with the informant to make certain of an accurate portrayal. In this second interview, questions are asked about the significance of events, background, options and how one event was linked to another. In this process certain *unevents* are disclosed (i.e. events that only were remembered after questioning or probing), and these are added to the dateline.

This interviewing process provides a rich, descriptive data base of IJV history, which in itself should hold much valuable information on partner perceptions, motivations, and cross-cultural communication.

4. The process is repeated with all informants in one partner group, so that we have a set of these chronologies which together comprise the ethno history for one partner. We then compare and aggregate these individual maps to build a single partner dateline using only those events reported by all individuals in that group, and/or other events that were reported and verified by documentation.

5. The mapping process is then conducted for the second partner, so that two datelines are produced.

6. The maps are then constructed. By analyzing ethnographic data from the interviews, events are plotted over time, events are distinguished by types, and linkages among events determined. The maps enable the identification of events and/or unevents that were consistently reported by one partner but not the other. Frequency distributions of events are examined to see if certain time periods were viewed as more eventful from one partner's perspective. Events that were interpreted in very different ways are identified. Event and unevent types can be compared in order to chart the domain of significant happenings.

7. Based on information in the maps, an index or profile of cognitive match can be developed, which is a simple way to express the overall degree of difference in the two topographies. (This index will have to allow for differences in topographies that are to be expected, e.g. events that actually involved only one partner.) The index can then be compared to some measure of JV performance or status, e.g. failure, restructuring, sellout, growth, etc.

The production of a map is vital to the utility of the method. The map is both the link between data collection and analysis, and it also is the tool that permits managers to "see" their problem in a very graphic and convincing manner. The map sums up all of the information gathered during the data collection phase and it provides a framework for data analysis (by allowing comparison of event frequencies and distributions, event types, and linkage structures). The map gives a clear and concise picture of very complex and in some ways "soft" management problems.

The map is backed-up by text material that describes each event in detail and provides other ethnographic data on the context of the events and their connections. Data shown on the maps can be analyzed both qualitatively (e.g. by explaining different event interpretations as the result of specific differences in cultural background) and quantitatively (e.g. by measuring the differences in frequency, distribution, and type of events to create an index of difference which can be compared to IJV performance on dimensions such as growth or structural stability.) The map can be used to identify and analyze differences in partner perceptions for joint ventures in a single nation, international joint ventures, international development projects, and consortial organizations.

SPECIFIC DESCRIPTION

Figure 1:
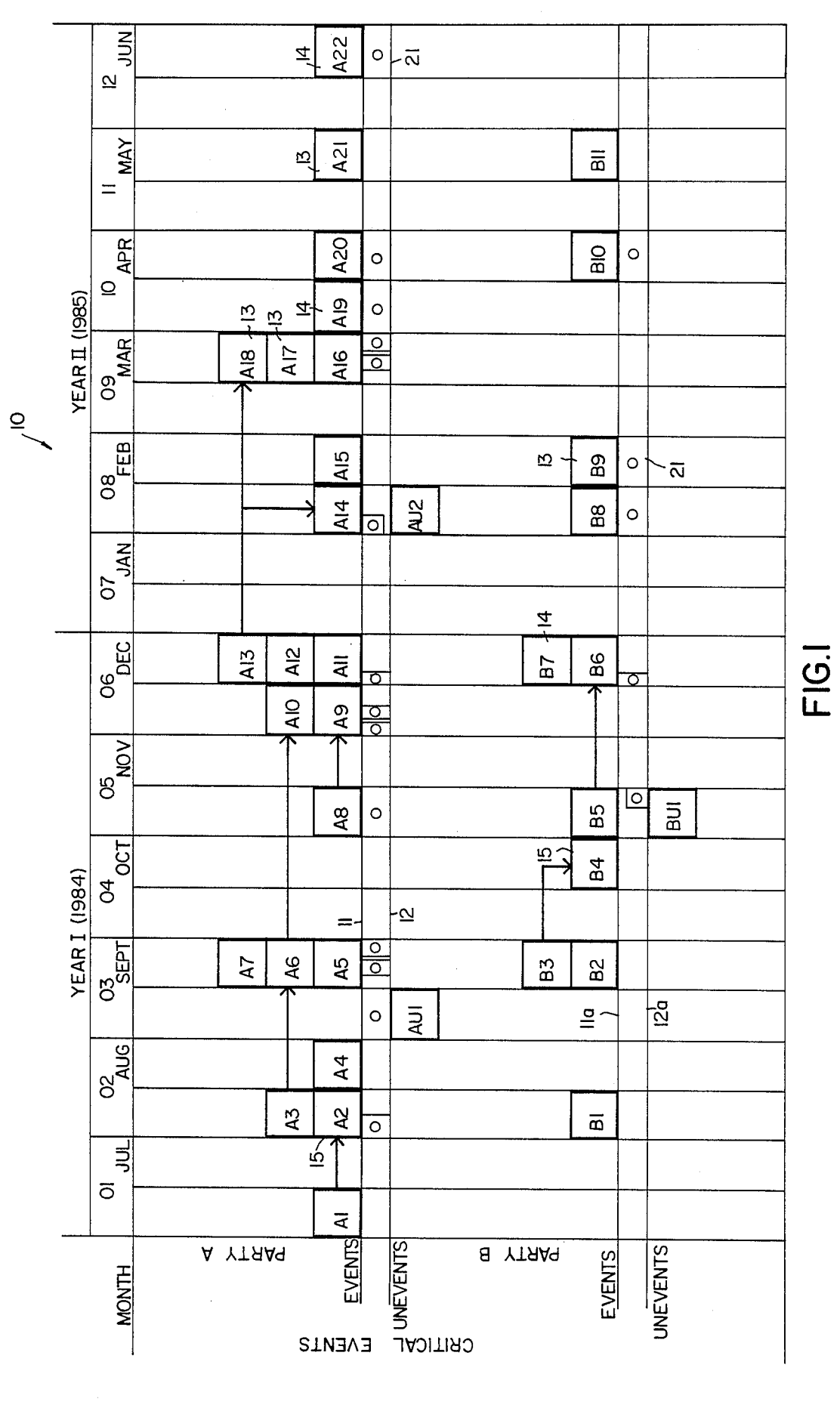
Figure 1A:
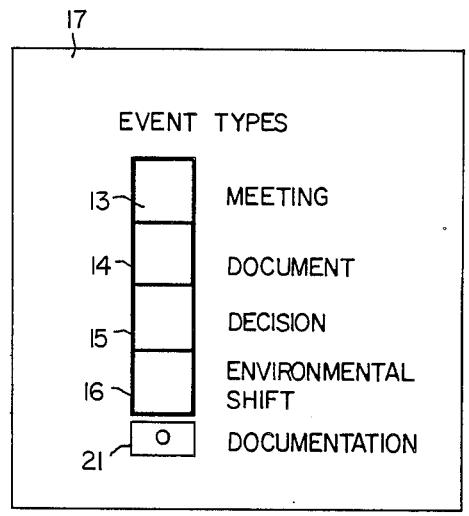
FIGS. 1A and 1B show legends 17 and 17a for FIG. 1.
Figure 1B:
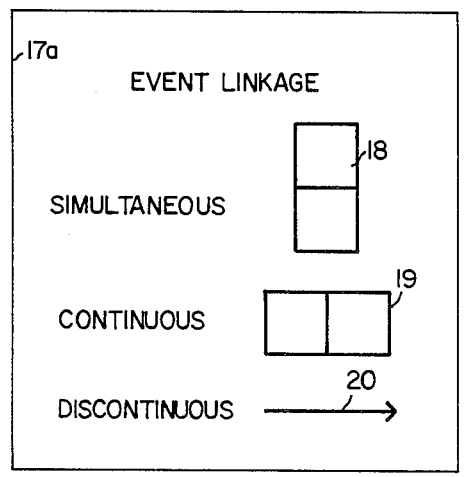

A representative map 10 is shown in FIG. 1. The map 10 portrays a 12 month sequence of events in the formation of an IJV spanning the last half of 1984 and first half of 1985. These maps can span decades and usually must be produced in a scroll or bifold paper form. Chronologies for two IJV partners are given, Party A (top) and Party B (bottom). Events (as reported in the first interview) are shown on top of the event line 11 and 11a; "unevents" (only reported after probing) are shown on the bottom of the line 12 and 12a. Each single event is portrayed as a box 13, 14, 15, 16 on the line. Events are numbered, with numbers referring to a description in text material which is attached. Shadings indicate types of event as shown in the legend 17. Linkages among events are reflected by their arrangement on the map 18 and 19, as well as by arrows 20 as shown by the legend 17a in FIG. 3. A dot appearing under the event line indicates that the event has been verified by text-based documentation (e.g. a memo or letter). The map of FIG. 1 is delivered to a client with (a) a text describing the events, their contexts and connections; (b) an executive summary outlining significant differences in partner perceptions of the past and their consequences for the IJV; and (c) a statistical analysis of differences in topographies.

This map of FIG. 1 events leading up to a joint venture between two firms based in the United States, one major corporation and the other a small start-up company.

Party A

Event A1 (01:Jul84)
- Second quarter report to Board of Directors indicates that increased foreign competition in main product line has resulted in 3% loss of U.S. market share over the past two quarters. Report promises a plan that will address the crisis (see A2).

Event A2 (02:Aug 84)
- CEO announces a plan that will be undertaken to meet foreign competition (see A1). The plan includes a requirement for new technology in the main product line, which may be obtained through corporate acquisition or through a joint venture.
- [Documentation: CEO open letter to shareholders.]

A3 (02:Aug 84)
- Executive Council meets to discuss plan outlined by CEO, and considers merits of acquisition versus joint venture. One of the members of the Executive Council (Mr. Q) agrees to make inquiries regarding possible joint venture partners (see A6).

Event A4 (02:Aug 84)
- CEO and COO meet with corporate counsel to discuss special legal problems related to joint ventures.

Unevent AUI (03:Sept 84)
- CEO decides to retain special outside counsel to assist in future joint venture deliberations.

Event A5 (03:Sept 84)
- Special counsel, corporate counsel, and Executive Committee meet to develop parameters for selection of joint venture partner. Foreign partners are considered specifically.

Event A6 (03:Sept 84)
- Mr. Q. circulates confidential memorandum regarding possible joint venture partners. (see A3.) Some of these possible partners do not meet specifications developed under A5.
- [Documentation: Confidential Memorandum A6.]

Event A7 (03:Sept 84)
- Special counsel prepares and circulates a confidential memorandum summarizing eight separate parameters to be used in search for a partner.
- [Documentation: Confidential Memorandum A7.]

Event A8 (05:Nov 84)
- Major US competitor announces new product based on significant new technology.
- [Documentation: Product Announcement/Advertising.

Event A9 (06:Dec 84)
- CEO decides (against advice of special counsel) to make an approach to one of the possible partners listed in confidential memorandum A6. This proposed partner did not meet two of the eight requirements set by the Executive Committee (i.e. the company was a start-up rather than a mature firm, and it did not have a broad enough "basket of products". It did, however, have an inside track on new developments in the technological field that the company needed to meet foreign and domestic competition). This decision was considered by outside counsel to be both premature and inappropriate. The CEO felt pressured because of mounting competition (see A8) to take immediate action, however, rather than waiting for a full investigation of all possible partners.
- [Documentation: Letter from Outside Counsel.]

Event A10 (06:Dec84)
- Mr. Q. circulates another confidential memorandum indicating that he has approached several of the firms on his list (see A6) and two are definitely interested.
- [Documentation: Confidential Memorandum A10.]

Event A11 (06:Dec 84)
- The company receives a letter from one of the prospective joint venture partners inviting representatives to come for a meeting. It is from the small start-up firm that the CEO had decided to approach (which turns out to be Party B).
- [Documentation: Letter from Party B.]

Event A12 (06:Dec 84)
- Meeting between top executives of Party A firm and owners of Party B firm. Party B demonstrates some of the new technology they are developing. Party A indicates a possible interest in providing financial resources to enable Party B to speed-up and complete certain R&D operations, with licensing of products to Party A. Party B appears interested in the money, but wants to be involved in marketing.

Event 13 (06:Dec 84)
- Executives of Party A debrief on meeting with Party B. After a closer inspection of the new technology under development, Party A is very interested in proceeding, but would like to exercise control in the venture since Party B is not judged to have sufficient managerial or marketing strength.

Event A14 (08:Feb 85)
- Parties A and B meet again to discuss possible arrangements for a joint project. Party A suggests technology licensing (see A13), but Party B wants a joint venture with managerial input on decisions related to product applications and marketing.
- [Documentation: Meeting Summary prepared by corporate counsel.]

Unevent U2 (08:Feb 85)
- CEO and Executive Council meet in special session to discuss Party B's position in the negotiations. It is decided to construct a joint venture arrangement, but to attempt to limit Party B's influence in use and sale of product. Party A hopes to dissuade Party B of exercising this influence by offering larger financial incentives and structuring the deal so that Party A provides managerial and marketing talent.

Event A15 (08:Feb85)
- Corporate counsel at Party A drafts proposal for a multi-phase joint venture. Phase I is described as a joint R&D mission financed by Party A, with technology and staff provided by Party B. Phase II involves engineering and manufacturing, with Party A bearing all costs and Party B serving as consultants. Phase III is a marketing strategy that relies heavily on Party A strength, but permits input and consultation (no veto power) from B.

Event A16 (09:Mar85)

CEO, after further investigation of Party B principals and technology, decides (privately) that he will permit Party A greater control in marketing if that is the price he has to pay to get their technology. However, he believes that ultimately he may have to buy out the owners of Party B in order to ensure control of the product.

Event A17 (09:Mar85)

Two Party A executives meet with representatives of another company (Party C) to discuss mutual interests. This company has a product line that complements the products under development by Party B.
[Documentation: Memo to CEO.]

Event A18 (09:Mar85)

Parties A and B meet again to discuss possible joint venture. Party B indicates they are not interested (no matter what the price) if they can't have some control over marketing.
[Documentation: Corporate counsel meeting summary.]

Event A19 (10:Apr 85)

Party A draws up an agreement for a joint venture that creates a bipartite board of directors for the joint venture, equally comprised of representatives from Parties A and B. The chairman of the board will be provided by Party A. The agreement provides to Party B $2.5 M over eighteen months years to complete development, testing and engineering of its new technology-based product.
[Documentation: Draft Agreement]

Event A21 (11:May85)

Parties A and B meet to discuss agreement. Some changes are made in the language pertaining to disposition of revenues from sales.

Event A22 (12:Jun85)

Finalized agreement for joint venture signed by Party A and transmitted to Party B for approval.)
[Documentation: Finalized agreement.]

Party B

Event B1 (02:Aug 84 )

International meeting of researchers (industrial and academic) working on the same set of problems related to party B's technology. Party B principals meet principals of another firm informally, and learn that the other firm recently entered into a joint venture arrangement that was providing $6 M in R&D funds.

Event B2 (03:Sept 84 )

A board meeting, where the need for new sources of financial support is discussed. The company's main research operation has reached an impasse, and a substantial infusion of new equipment will be required in order to address problems encountered. One of the Party B founders (Dr. T) is of the opinion that the problem may not be soluble, and urges the firm to consider alternative routes to product development that ultimately would require more time.

Event B3 (03:Sept 84 )

Another of the Party B founders (Dr. S) meets an old friend at a dinner party, where he indicates that Party B is looking for an infusion of capital from a source that won't take control of the company (e.g. venture capitalists.) The old friend (who turns out to be Mr. Q) suggests that he may be able to be of help.

Event B4 (04:Oct85)

After continued financial problems, Dr. S decides that he is going to pursue the opening offered by his old friend and initiates an inquiry to Party A (see B3).

Event B5 (05:Nov85)

Dr. S, after consulting with his colleagues, sends a letter to his friend at Party A suggesting that Party B's technology may be of interest and that a meeting should be held.

Unevent BUL (05:Nov 84 ).

Another of the co-founders (Dr. W) meets in a bar with one of Party B's university consultants and tells him (privately) that he thinks it is a mistake to get involved with Party A because they will have no appreciation for the power and sophistication of the technology under development.
[Documentation: Dr. W's journal.]

Event B6 (06:Dec 84)

Party B Co-founders meet with Party A representatives to discuss the technology under development. Party B indicates that the research problems are definitely soluble with more financial resources and a short amount of time (about one year). Dr. T does not express his concern regarding the fundamental nature of the problem. The financial requirements of Party B don't appear to trouble Party A. Rather, Party A seems overly concerned with marketing. Party B has a strong philosophical position regarding their commitment to take this technology from conception to the marketplace, and they believe they are the only group that can demonstrate the technology's true potential through continuing refinements. However, the main point at the moment is the immediate need for money.
[Documentation: Dr. W's journal.]

Event B7 (06:Dec 84 )

Dr. W. circulates an internal memorandum explaining why he opposes cooperation with Party A. Dr. W prefers to wait to learn the outcome of their SBIR Phase 2 proposal, since he believes the $0.5 M provided by this grant would be sufficient.

Event B8 (08:Feb 84 )

Parties B and A meet to continue their discussions. Dr. W refuses to participate unless a strong effort of maintaining marketing control is exercised. Dr. S and Dr. T (the other co-founder) agree to this compromise, because they are very interested in the relatively large and fat funds Party A could provide. Dr. T (privately) hopes to get Party A funds in order to begin work on a related research effort that is more basic in nature and would require three to five years of effort. This point, however, is not emphasized in the meeting.
[Documentation: Meeting Summary prepared by Dr. T]

Event B9 (08:Feb 84 )

The co-founders have a serious argument regarding co-operation with Party A. Dr. W feels strongly that Party A does not understand or appreciate Party B's technology, and that they will interfere in product development. Dr. T, on the other hand, insists that a major financial backer is absolutely essential or the firm will not survive.
[Documentation: Dr. W's journal.]

Event B10 (10:Apr 85)
   Party B's SBIR Phase 2 proposal receives a relatively high score, but not high enough for funding. One of the reviewers agreed with Dr. T that the problem may not be soluble.

Event B11 (11:May 85)
   Dr. S and Dr. T go to meet with Party A alone. Dr. W agrees to comply with the outcome of their decision. A very advantageous deal is worked out, whereby Party B will obtain $2.5 M in R&D funds over 18 months, plus a substantial percentage on sales, as well as hands-on participation in the management of the joint venture. Dr. T is delighted because the amount and the time horizon will permit him to launch another research line in case the main operation should fail. Dr. W seems satisfied that Drs. S and T know how to run the business. (This data needs analysis).

FIGS. 2, 3 and 4 show alternate arrangements for the data of FIG. 1 in maps 10a, 10b and 10c. The documentation is shown by dots in a square 21a as the reverse of what is shown in FIG. 1. The differences can be color coded to make them more readable.

It is intended that the foregoing description be only illustrative of the present invention and that the invention be limited only by the hereinafter appended claims.

I claim:

1. A method for mapping organizational events from an individual perspective of two different venturers A and B which comprises:
   (a) separately gathering event data by an initial interview from each of the venturer A and B on a chronological basis, wherein the event data separately includes the content and dates of meetings, documents, decisions and environmental shifts and documentation by each venturer A and B for the event data;
   (b) separately re-interviewing each venturer A and B to gather unevent data not seen as significant in the initial interview and the documentation by each venturer A and B for the unevent data;
   (c) mapping the event and unevent data chronologically on a map which comprises chronological segments by days, months or years across a sheet of paper with the days, months or years separated along the chronological segments; first segments for mapping the event data in the first segments in parallel spaced relationship to the chronological segments and second segments in parallel spaced relationship to the first segments for venturer A for mapping the unevent data in the second segments; third segments for venturer B for mapping the event data in the third segments in parallel spaced relationship to the chronological segments and below the first and second segments for venturer A and fourth segments in parallel spaced relationship to the third segments of venturer B for mapping the unevent data in the fourth segments with an indication of the documentation for venturers A and B for each of the events and unevent data; and
   (d) analyzing the data on the map to determine where there were differences in the event data and unevent data.

2. A method for mapping organizational events from an individual perspective of two different venturers A and B which comprises:
   (a) separately gathering event data by an initial interview from each of the venturers A and B on a chronological basis, wherein the event data separately includes the content and dates of meetings, documents, decisions and environmental shifts as the event data and documentation by each venturer A and B for the event data;
   (b) separately re-interviewing each venturer A and B to gather unevent data not seen as significant in the initial interview and documentation by each venturer A and B for the unevent data;
   (c) mapping the event and unevent data chronologically on a map which comprises a chronological line by days, months or years across a sheet of paper with the days, months or years separated by second lines perpendicular to the chronological line; a first line for mapping the event data along and above the first line in parallel spaced relationship to the chronological line and a second line in parallel spaced relationship to the first line for venturer A for mapping the unevent data below the second line; a third line for venturer B for mapping the event data along and above the third line in parallel spaced relationship to the chronological line and below the first and second lines for venturer A and a fourth line in parallel spaced relationship to the third line of venturer B for mapping the unevent data below the fourth line with an indication of the documentation for venturer A between the first and second lines and for venturer B between the third and fourth lines; and
   (d) analyzing the data on the map to determine where there were differences in the event data and unevent data.

3. The method of claim 1 wherein the venturers A and B are from the same countries.

4. The method of claim 1 wherein the venturers A and B are from different countries and cultures.

5. A chronological map in the form shown in FIG. 1.

6. The method of claim 2 wherein the map is produced by each venturer A and B as the events develop.

7. The method of claim 2 wherein the map is produced after a period of time has elapsed.

8. A chronological map for events from an individual perspective of two different venturers A and B which comprises:
   (a) chronological segments by days months or years across a sheet of paper with the days, months or years separated along the chronological line;
   (b) first segments along the chronological segment and second segments in parallel spaced relationship to the first segments for venturer A;
   (c) third segments for venturer B in parallel spaced relationship to the chronological segments and below the first and second segments for venturer A and fourth segments in parallel spaced relationship to the third segments of venturer B; and
   (d) events plotted on the chronological map by the method which comprises separately gathering event data by an initial interview from each of the venturer A and B on a chronological basis, wherein the event data separately includes the content and dates of meetings, documents, decisions and environmental shifts as the event data and documentation by each venturer A and B for the event data; separately re-interviewing each of the venturers A and B to gather unevent data not seen as significant in the initial interview and the documentation by each venturer A and B for the unevent data; mapping for venturer A the event data in the first segments and the unevent data in the second segments and mapping for venturer B the event data in the third segments and the unevent data in the fourth segments with an indication of the documentation for venturer A in the first and second segments and for venturer B in the third and fourth segments.

9. A chronological map for organizational events from an individual perspective of two different venturers A and B in the business which comprises:
(a) a chronological line by days, months or years across a sheet of paper with the days, months or years separated by second lines perpendicular to the chronological line;
(b) a first line in parallel spaced relationship to the chronological line and a second line in parallel spaced relationship to the event line for venturer A;
(c) a third event line in parallel spaced relationship to the chronological line and below the first and second lines for venturer A and a fourth line in parallel spaced relationship to the third line of venturer B; and
(d) business events plotted on the chronological map by the method which comprises separately gathering event data by an initial interview from each of the venturer A and B on a chronological basis, wherein the event data separately includes the content and dates of meetings, documents, decisions and environmental shifts as the event data and documentation by each venturer A and B for the event data; separately re-interviewing each venturer A and B to gather unevent data not seen as significant in the initial interview and the documentation by each venturer A and B for the unevent data; mapping for venturer A the event data above the first line and the unevent data below the second line and mapping for venturer B the event data above the third line and the unevent data below the fourth line with an indication of the documentation for venturer A between the first and second lines and for venturer B between the third and fourth lines.

10. The map of claim 9 in the form shown in FIG. 1.

* * * * *